US012641207B2

(12) United States Patent
Varekamp et al.

(10) Patent No.: US 12,641,207 B2
(45) Date of Patent: May 26, 2026

(54) PRESENTATION OF MULTI-VIEW VIDEO DATA WITH REDUCED DEPTH FRAME RATE

(71) Applicant: KONINKLIJKE PHILIPS N.V., Eindhoven (NL)

(72) Inventors: Christaan Varekamp, Veldhoven (NL); Andy Willems, Eindhoven (NL)

(73) Assignee: Koninklijke Phiips N.V., Eindhoven (NL)

( * ) Notice: Subject to any disclaimer, the term of this patent is extended or adjusted under 35 U.S.C. 154(b) by 0 days.

(21) Appl. No.: 18/693,968

(22) PCT Filed: Sep. 13, 2022

(86) PCT No.: PCT/EP2022/075329
§ 371 (c)(1),
(2) Date: Mar. 21, 2024

(87) PCT Pub. No.: WO2023/046520
PCT Pub. Date: Mar. 30, 2023

(65) Prior Publication Data
US 2024/0388681 A1 Nov. 21, 2024

(30) Foreign Application Priority Data
Sep. 22, 2021 (EP) ..................................... 21198227

(51) Int. Cl.
*H04N 13/111* (2018.01)
*H04N 13/139* (2018.01)
(Continued)

(52) U.S. Cl.
CPC ......... *H04N 13/111* (2018.05); *H04N 13/139* (2018.05); *H04N 13/189* (2018.05);
(Continued)

(58) Field of Classification Search
None
See application file for complete search history.

(56) References Cited

U.S. PATENT DOCUMENTS 9,736,454 B2 8/2017 Hannuksela et al.
2007/0030342 A1* 2/2007 Wilburn ............... H04N 25/531
348/47
(Continued)

FOREIGN PATENT DOCUMENTS

WO 2016167814 A1 10/2016

OTHER PUBLICATIONS

Ekmekcioglu Erhan et al., "Bit-Rate Adaptive Downsampling for the Coding of Multi-View Video with Depth Information", 3DTV Conference: The True Vision—Capture, Transmission and Siplay of 3D Video, 2008, IEEE, Piscataway, NJ, USA, May 28, 2008, XP031275230.*

(Continued)

*Primary Examiner* — Edemio Navas, Jr.

(57) ABSTRACT

A method for presenting multi-view video data of a scene. The method comprises obtaining one or more sequences of source view images of the scene at a source view frame rate and obtaining one or more sequences of source view depth components of the scene at a source view depth frame rate. The source view depth frame rate is lower than the source view image frame rate. A selection between a source view playback mode and an interpolated playback mode is obtained, where, if the interpolated playback mode is selected, an interpolated image of the scene is generated based on one or more source view images from one or more of the sequence of source view images and on one or more corresponding source view depth components from at least one sequence of source view depth components. The interpolated image is output to a display. If the source view (Continued)

202 — Obtain images at source view frame rates

204 — Obtain depth components at depth frame rate

210 — Output images

206 — Generate interpolated image

208 — Output interpolated image playback mode is selected, a sequence of source view images is output to the display.

22 Claims, 1 Drawing Sheet

(51) Int. Cl.

| | |
|---|---|
| *H04N 13/189* | (2018.01) |
| *H04N 19/587* | (2014.01) |
| *H04N 21/218* | (2011.01) |
| *H04N 21/81* | (2011.01) |

(52) U.S. Cl.
CPC ..... *H04N 19/587* (2014.11); *H04N 21/21805* (2013.01); *H04N 21/816* (2013.01)

(56) References Cited

U.S. PATENT DOCUMENTS

| | | | | |
|---|---|---|---|---|
| 2010/0045678 | A1 | 2/2010 | Reid | |
| 2013/0070053 | A1 | 3/2013 | Miyoshi | |
| 2013/0243103 | A1* | 9/2013 | Sasaki | H04N 13/161 |
| | | | | 375/240.01 |
| 2014/0146139 | A1* | 5/2014 | Schwartz | H04N 13/128 |
| | | | | 348/43 |
| 2016/0100165 | A1* | 4/2016 | Zhao | H04N 19/139 |
| | | | | 375/240.03 |
| 2016/0381341 | A1 | 12/2016 | El Choubassi et al. | |
| 2019/0130593 | A1 | 5/2019 | Riemens | |
| 2020/0045287 | A1 | 2/2020 | Varekamp et al. | |
| 2020/0311870 | A1* | 10/2020 | Jung | G06T 3/4046 |
| 2020/0329189 | A1 | 10/2020 | Tanaka et al. | |
| 2022/0086203 | A1* | 3/2022 | Morris | H04N 7/157 |
| 2022/0116660 | A1* | 4/2022 | Walker | H04N 19/44 |

OTHER PUBLICATIONS

International Search Report and Written Opinion from PCT/EP2022/075329 mailed Dec. 2, 2022.

Ekmekcioglu E et al: "Bit-Rate Adaptive Downsampling for the Coding of Multi-View Video with Depth Information", 3DTV Conference: The True Vision-Capture, Transmission and Display of 3D Video, 2008, IEEE, Piscataway, NJ, USA, May 28, 2008 (May 28, 2008), pp. 137-140, XP031275230, DOI: 10.1109/3DTV.2008.4547827.

Emori Takaaki et al: "Free-viewpoint video synthesis from mixed resolution multi-view images and low resolution depth maps", Proceedings of SPIE, IEEE, US, vol. 9391, Mar. 16, 2015 (Mar. 16, 2015), pp. 93911C-93911C.

* cited by examiner

PRESENTATION OF MULTI-VIEW VIDEO DATA WITH REDUCED DEPTH FRAME RATE

CROSS-REFERENCE TO PRIOR APPLICATIONS

This application is the U.S. National Phase application under 35 U.S.C. § 371 of International Application No. PCT/EP2022/075329, filed on Sep. 13, 2022, which claims the benefit of EP Patent Application No. EP 21198227.7, filed on Sep. 22, 2021. These applications are hereby incorporated by reference herein.

FIELD OF THE INVENTION

The invention relates to the presentation of multi-view video data. In particular, the invention relates to the presentation of multi-view video data using relatively low computational resources.

BACKGROUND OF THE INVENTION

Multi camera video capture and viewpoint interpolation allow for applications such as augmented reality (AR) and virtual reality (VR). Usually, the necessary calculations (e.g. calibration, depth estimation and view synthesis) are performed as fast as possible such that the live streaming of events to AR/VR headsets and mobile phones with interactive 3D look-around effect becomes possible.

However, simultaneous depth estimation for many cameras (e.g. >8) in real-time is currently very costly in terms of bandwidth and compute infrastructure. Consequently, applications based on multi-view video data have difficultly entering the market.

US 2010/045678 A1 discloses capturing image data by capturing a set of images based on the selection of a set of points of capture, wherein at least some of the points of capture are distributed with a substantially constant or substantially smoothly varying average density across a first two-dimensional area.

SUMMARY OF THE INVENTION

The invention is defined by the claims.

According to examples in accordance with an aspect of the invention, there is provided a method for presenting multi-view video data of a scene, the method comprising:

obtaining one or more sequences of source view images of the scene at a source view frame rate;

obtaining one or more sequences of source view depth components of the scene at a source view depth frame rate, wherein the source view depth frame rate is lower than the source view image frame rate; and obtaining a selection between a source view playback mode and an interpolated playback mode, wherein the method further comprises:

if the interpolated playback mode is selected:

generating an interpolated image of the scene based on one or more source view images from one or more of the sequence of source view images and on one or more corresponding source view depth components from at least one sequence of source view depth components; and outputting the interpolated image is output to a display, and if the source view playback mode is selected, outputting a sequence of source view images to the display.

Multi-view video generation often requires a large amount of data to be processed and/or transmitted due to the requirement of source view (texture) images and source view depth components (i.e. depth components) to generate the multi-view video. Obtaining the sequence of depth components at a lower frame rate than the sequence of source view images enables the reduction of processing resources required to generate the depth components and/or to transmit the depth components.

A sequence of source view images may be one or more conventional two-dimensional videos of a scene. At least two of the sequences of source view images may be obtained from different cameras, wherein the cameras have different positions (i.e. poses) in the scene. The source frame rate is the rate at which images are obtained (i.e. how many images are obtained per second) of a sequence of source view images. A frame rate may be determined as the reciprocal of the time interval between successive frames. That is if the time interval is $\Delta t$, the frame rate can be determined as $1/\Delta t$. A higher frame rate is associated with a shorter interval between frames; a lower frame rate is associated with a longer interval between frames.

A sequence of depth components may be a sequence of depth maps of the scene separated in time based on the depth frame rate. The depth maps may be obtained by, for example, performing depth estimation on pairs of source view images from the sequence of source view images. The depth frame rate is the rate at which the depth components are obtained (e.g. how many depth maps per second). The depth frame rate may be constant (e.g. 1 fps) or variable (e.g. based on whether there is an important event occurring in the scene or not).

Obtaining a sequence of depth components may comprise obtaining a depth video, wherein a depth video is a sequence of depth components of the scene each obtained at a different time. In other words, a depth video is equivalent to a video but with each frame of the depth video being a depth component instead of an image.

The depth components and the source view images may have time-stamps corresponding to the time at which they were taken.

A sequence of source view images may be a source video, wherein each source view image is a frame of the source video. A depth component corresponding to a source view image is a depth component obtained within a pre-defined time of the source view image, wherein the pre-defined time is defined by the depth frame rate and/or the source view frame rate. For example, a depth component corresponding to a source view image may be a depth component obtained at a similar time to the source view image, wherein the time difference between the depth component's time stamp and the source component's time stamp is less than, for example, 1/dfr (where dfr is the depth frame rate) or 1/sfr (where sfr is the source frame rate).

The interpolated image may be generated based on a target viewpoint Each source view image and depth components may correspond to a source viewpoint and a depth viewpoint respectively. The generation of the interpolated image may be based on all of the latest source view images and all of the corresponding depth components. Alternatively, the source viewpoints and depth viewpoints may be taken into consideration when choosing which source view images and depth components to use.

For example, the source viewpoints and depth viewpoints may be ranked based on pose proximity to the target viewpoint and a number of the top ranked (i.e. closest) viewpoints may be used for generating the interpolated image.

The selection of source view playback mode or interpolated playback mode may be done by the user, by a controller or automatically (e.g. by using an event detection algorithm).

Selecting the source view playback mode will output one (or more if, e.g. two screens) of the sequence of source view images. The user may be able to select which of the source video(s) they would like to watch (i.e. which source videos are output when in source view playback mode). The user may be able to switch between sequences of source view images during playback, in order to switch viewpoints.

Selecting the interpolated playback mode will output an interpolated image of the scene (e.g. a frame of an immersive video). The interpolated image is obtained based on the source views and the depth components (e.g. generating and rendering 6DoF multi-view data) and may enable the user to virtually move around the scene, to viewpoints in between the source view image sequences.

The method may further comprise caching one or more of the sequences of source view images for at least an intermediate time period, wherein the intermediate time period is at least the difference in time between a latest available source view image and the source view depth components used to generate an interpolated image.

If the selection changes from the interpolated playback mode to the source view playback mode, the method further comprises selecting a closest view image sequence from the sequences of source view images based on a target viewpoint of the interpolated image and source viewpoints of each one of the sequence of source view images, outputting a cached image sequence corresponding to the closest view image sequence and, after outputting the cached image sequence, outputting the closest view image sequence.

Caching is the process of storing data in a cache. A cache is a temporary storage area. The intermediate period of time is at least as long as the period of time between the latest available image in the sequences of source view images and the latest available depth component in the sequence of depth components.

Each sequence of source view images may have a corresponding viewpoint defined by the camera used to obtain the sequence. However, the target viewpoint corresponding to the interpolated image is defined by the area of the scene which is being viewed at a particular time.

The intermediate time period may be longer than the time difference between latest available source view image and depth component if, for example, an earlier depth component was used to generate the interpolated image. The intermediate time period may be the time difference between the latest available source view image and the latest depth component used to generate the latest interpolated image.

The closest video (i.e. closest image sequence) is the source video which has a viewpoint nearest to the current viewpoint of the user in the 6DoF video. A cached source video corresponding to the closest video may be output at a sped up frame rate, where the time between frames has been reduced (e.g. from 30 fps to 60 fps). The sped up version may be shown until the user has caught up with the latest available frame of the source videos.

The sequences of source view images may be cached at a reduced frame rate, wherein the reduced frame rate is lower than the source frame rate.

The method may further comprise obtaining an indication of an event at an event time and, based on the selection changing from the interpolated playback mode to the source view playback mode, outputting one of the sequence of source view images starting from a source view image taken before the event time.

For example, during the broadcast of a soccer match, a goal may occur. The goal (i.e. the event) may be indicated by a controller or an automatic event detection algorithm. The event time is the time at which the goal (i.e. the event) occurred. Thus, when changing to the source view playback mode, a user can see the goal occur even if it happened before switching to the source view playback mode.

The source view frame rate may be at least 20 frames per second, fps, and wherein the source view depth frame rate is at most 10 fps. Preferably, the source frame rate is at least 30 fps. Even more preferably, the source frame rate is 50 fps or 60 fps.

In some instances, the depth frame rate may be as low as 1 fps or less. The depth frame rate will likely depend on the processing power available to generate the depth video (e.g. at a server, user device or a combination of both).

The method may further comprise receiving a target viewpoint for the interpolated image, identifying one or more closest sequences of source view images based on the target viewpoint and identifying the latest available source view depth components corresponding to the closest sequences of source view images, wherein generating the interpolated image of the scene is based on the closest sequences of source view images and the identified source view depth components.

For example, in some instances, the latest available depth component may only include half of the scene. This may be because the latest depth component only includes depth information for half of the scene. This is likely to occur if a processing system cannot generate all of the possible depth maps in the time given by the depth frame rate. Thus, a previous (earlier) depth component (with the necessary section of the scene) can be used to generate and output a second interpolated image instead such that the user can view the whole scene in an interpolated image, even if it is one (or more) frame(s) late.

The closest sequence of source view images may be identified based on a source viewpoint of the sequence having a similar pose within the scene as that of the target viewpoint A target viewpoint may be defined by a virtual camera having a virtual pose (position and orientation) in the scene. Similarly, the source viewpoints are at least partially defined by the positions of the cameras in the scene. Thus, the closest sequence can be identified based on the camera with the most similar pose to the target viewpoint.

In some cases, all of the available source view images may be used for the synthesis of the interpolated image, where each source view image may be weighted differently depending on ray-angle differences and other metrics.

Receiving the sequence of source view images may comprise receiving an encoded atlas comprising scaled sequences of source view images, wherein the scaled sequences of source view images have a lower pixel resolution than the sequences of source view images, decoding the encoded atlas and performing an inverse scaling on the scaled sequences of source view images, thereby obtaining the sequences of source view images.

Scaling the sequences of source view images will reduce the amount of data required to be stored/transmitted for the sequences of source view images.

An inverse scaling algorithm may be used to return the scaled source videos to a full resolution source video.

The scaled sequences of source view images may comprise non-uniformly scaled source images and the non-uniformly scaled source images may comprise one or more regions of the non-uniformly scaled source images scaled differently to the rest of the non-uniformly scaled source images.

The scaling on one or more sections of the images in the sequences of images may be scaled differently to the other sections of the images. For example, sections of the image sequences which are "less important" (e.g. the crowd in the broadcast of a soccer match) may be scaled down such that they have less pixels than the other sections (e.g. the players and field of the soccer match).

Scaling may comprise downsampling, compression or decimation. In general, scaling comprises the reduction of data. For example, scaling a region of a source view image may comprise reducing the pixel density of said region.

In some examples, the non-uniformly scaled source view images may include a first section that is downsampled to a greater extent in at least one dimension, and a second section that is downsampled to a lesser extent in the at least one dimension. The at least one dimension may be a vertical dimension. The first section and second section may be vertically adjacent sections.

Obtaining the sequences of source view depth components may comprise one of receiving the sequences of source view depth components from a server, encoder and/or capture system or performing depth estimation on two or more of the source view images.

Alternatively, obtaining the sequences of source view depth components may comprise receiving one or more sequences of partial source view depth components from a server, encoder and/or capture system and generating the sequences of source view depth components based on the sequences of partial source view depth components and performing depth estimation on two or more of the source view images.

A partial depth component may comprise depth information for only a section of the scene or depth information at a relatively low resolution. The partial depth component can then be turned into a full resolution depth component by, for example, the client device performing depth estimation on source view images and combining the received partial depth components and the output of the depth estimation.

If the selection changes from the interpolated playback mode to the source view playback mode, the method may further comprise selecting a closest view image sequence from the sequences of source view images based on a target viewpoint of the interpolated image and source viewpoints of each one of the sequences of source view images, scaling the source view images of the closest view image sequence thereby to make the proportions of the scene in the source view images approximately the same as the proportions of the scene in the interpolated image and outputting the scaled source view images of the closest view image sequence.

When switching from interpolated playback mode back to source view playback mode, it may be advantageous to temporarily show a scaled version of the source view images (e.g. zoomed in or zoomed out) of the closest source view sequence. For example, consider a situation where a viewer has translated a virtual (target) camera forward into the scene in interpolation playback mode. Switching back to source view playback mode would cause an abrupt visual change as it would be seen as an abrupt translation of a virtual camera back to a source viewpoint The source view images can thus be scaled such that the objects in the scene appear at a similar size and proportions (e.g. within 20% scaling) to the user when switching modes.

Scaling the source view images may comprise determining an image scale factor which, when applied to a source view image, would result in an image that contains objects at roughly the same scale (but not perspective) as the current virtual viewpoint in the interpolated playback mode. The scaled images may then be gradually scaled back to the original source view images.

If, in the interpolated playback mode, the user has "moved backwards", it may be advantageous to scale the source view images down such that the proportions of the scene stay similar when switching modes. In some cases, this may mean outputting a visually smaller image with black sections around the edges. However, this may prevent a sudden "zoom in" of virtual camera when switching modes.

Outputting the scaled source view images may be advantageously combined with outputting a sped up version of the cached video such that a sped up and scaled version of the source view videos are output when switching from interpolated mode to source view mode.

If the selection changes from the source view playback mode to the interpolated playback mode, generating the interpolated image may comprise identifying a level of scaling for the output sequences of source view images in the source view playback mode and generating the interpolated image at a target viewpoint wherein the target viewpoint is based on a source view viewpoint of the output sequence of source view images and the level of scaling.

The method may further comprise determining the target viewpoint The target viewpoint may be determined by selecting an initial viewpoint for a virtual camera identical to the source view viewpoint and selecting a focal length for the virtual camera such that objects in the target viewpoint at the selected focal length, appear approximately the same in proportion to the objects in the source view images. For example, the focal length of the virtual camera may be the same, or almost the same, as the focal length corresponding to the source view images.

Optionally, the target viewpoint is determined by translating the initial viewpoint in the depth direction such that a foreground object in the interpolated image has approximately the same proportions as the same foreground object in the output scaled source view images.

The level of scaling may be a percentage of scaling.

The translation may be determined based on the depth of the object (e.g. measured from depth components).

A foreground object is any object which is not a background object and may be determined, for example, based on object detection algorithms, depth thresholds etc.

The depth direction may be the direction perpendicular to the sensor of a camera (or virtual sensor of a virtual camera). The depth direction may be defined by the orientation of the camera (or virtual camera).

The invention also provides a computer program product comprising computer program code which, when executed on a computing device having a processing system, cause the processing system to perform all of the steps of the method for presenting multi-view video data of a scene.

The invention also provides a decoder system for presenting multi-view video data of a scene, the system comprising a processing system configured to:

obtain one or more sequences of source view images of the scene at a source view frame rate;

obtain one or more sequences of source view depth components of the scene at a source view depth frame rate, wherein the source view depth frame rate is lower than the source view image frame rate; and obtain a selection between a source view playback mode and an interpolated playback mode, wherein the processing system is further configured to:

if the interpolated playback mode is selected:

generate an interpolated image of the scene based on one or more source view images from one or more of the sequence of source view images and on one or more corresponding source view depth components from at least one sequence of source view depth components; and output the interpolated image is output to a display, and if the source view playback mode is selected, output a sequence of source view images to the display.

The source view frame rate may be at least 20 frames per second, fps, and wherein the source view depth frame rate may be at most 10 fps.

The processing system may be further configured to receive a target viewpoint for the interpolated image, identify one or more closest sequences of source view images based on the target viewpoint and identify the latest available source view depth components corresponding to the closest sequences of source view images, wherein generating the interpolated image of the scene is based on the closest sequences of source view images and the identified source view depth components.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
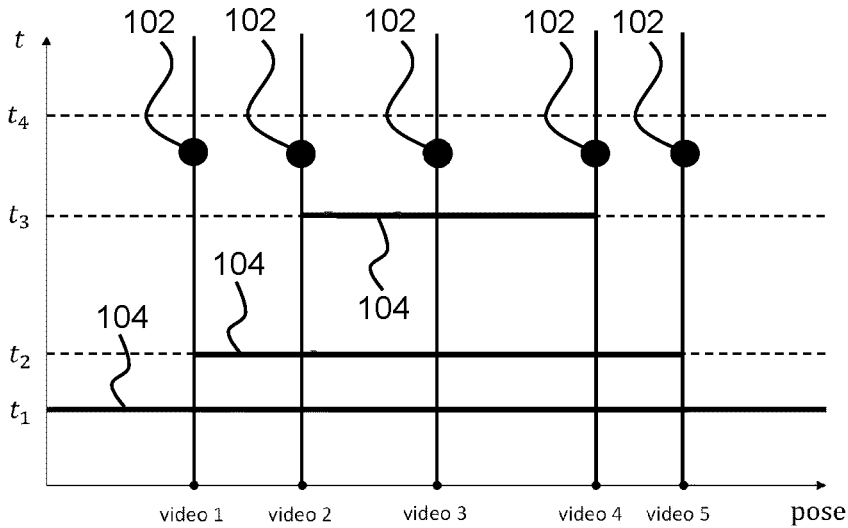
FIG. 1 illustrates from which poses a scene can be viewed at different times.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention is a method for presenting multi-view video data of a scene. The method comprises obtaining one or more sequences of source view images of the scene at a source view frame rate and obtaining one or more sequences of source view depth components of the scene at a source view depth frame rate. The source view depth frame rate is lower than the source view image frame rate. A selection between a source view playback mode and an interpolated playback mode is obtained, where, if the interpolated playback mode is selected, an interpolated image of the scene is generated based on one or more source view images from one or more of the sequence of source view images and on one or more corresponding source view depth components from at least one sequence of source view depth components. The interpolated image is output to a display. If the source view playback mode is selected, a sequence of source view images is output to the display.

FIG. 1 illustrates from which poses a scene can be viewed at different times. FIG. 1 shows a graph with different poses relative to the scene in the x axis and time in the y axis. In this illustration, it is assumed five cameras are used to obtain sequences of source view images of the scene, each camera corresponding to a different pose (and thus a different viewpoint) in the scene. The points 102 show the latest available source view image from each camera (i.e. the latest available frame from a source video of each camera). The thick lines 104 show the poses/viewpoints at which an interpolated image could be generated based on the available depth data (i.e. depth components) at the time.

The sequences of source view images may be source videos. An interpolated image is an image of the scene which is generated based on source view images and depth components. In other words, an interpolated image is not captured by a sensor (e.g. a camera) but, instead, is constructed/estimated based on texture and depth data of the scene.

A viewer that is observing the third source video (from the left) in real-time could switch between source videos for the discrete poses at which the source videos were captured, shown by the points 102. When the viewer wants to see an interpolated image of the scene, a closest moment in time (e.g. t3) for the particular pose/viewpoint is selected for which depth processing has been completed (i.e. for which depth components are available).

The viewer may be able to "move" smoothly through viewpoints corresponding to the thick lines 104. For a close moment in time (e.g. t3), the depth components may only be partially available due to limited processing resources (e.g. for depth estimation) and thus the thick line 104 at time t3 only contains viewpoints between the second, third, and fourth cameras. In that case, if the viewer "moves" to a target viewpoint not included in the thick line 104 at time t3 (e.g. a viewpoint between the first camera and the second camera), the processing system may "jump" to a different moment further back in time (e.g. time t2) for which an interpolated image can be generated for the target viewpoint.

When the viewer wants to switch back from the still interpolated image to a source view video, the nearest video anchor with the closest corresponding viewpoint may be selected. The output image will seem to hence 'snap' to the viewpoint of the closest source video anchor but may also jump in time to the current time of the closest source video. The jump in time could be avoided by caching video (e.g. at a lower frame rate) for each source video and, when switching back to a source view playback mode, outputting a sped up version of the cached video such that it will catch up with, for example, a live stream (i.e. it will catch up to the latest available frames at points 102).

Depth estimation for the generation of the depth components (e.g. at an encoder system) may take place at a fixed frequency/frame rate (e.g. 0.1, 0.5, 1 Hz) which depends on available computational resources. Alternatively, the depth components may have a variable frequency/frame rate which may depend on, for example, important events occurring in the scene. Typically the depth components will be depth maps or depth images. In general, the depth components contain information of the depth of objects in the scene. The depth components may comprise depth data relative to a particular pose (i.e. position and orientation) in the scene (e.g. pose of a depth sensor or of camera used to estimate depth component).

A capture system may capture the source videos of the scene. The capture system may also generate the depth components from the source videos or, alternatively, may generate the depth components from captured depth data of the scene. The capture system may then transmit the source videos and the depth components (at a lower frequency) to a client system (i.e. decoder system). The client system may then generate the interpolated image.

Certain important events in the scene could be automatically detected (e.g. using an algorithm) or manually triggered by an operator. Such important events may receive a higher priority when switching from source playback mode to interpolated playback mode. For example, when a triggered event is available within a time shift of e.g. less than 5 seconds, the client system may switch to that moment although there may be a moment available closer by in time originating from the fixed temporal sampling.

To allow for efficient switching between source view videos, the source view videos could be pre-processed (e.g. undistorted, rectified, packed and scaled) by a capture system. For instance, eight source view videos could be packed together in single 4K video frame at 30 Hz or 50 Hz. The client system could then decode the packed video and, depending on the target viewpoint selects the correct tile from the video atlas and shows it on the screen.

Effective video packing is advantageous for fast, low-latency, source view switching by the client system such that the different source videos can be retrieved instantly during streaming. This may be achieved by packing the multiple source videos into a single video frame (e.g. 4K). Additional scaling can help to pack more views into a single video frame. For example, for a horizontal sports capture setup, the middle region (vertically) of a camera view is most important. A non-linear scaler could thus, for example, half the vertical number of pixels of a source view image by reducing the resolution at the top and bottom of the image with more than a factor 2 but keep the resolution constant at the center of the source view image (where the action happens). This non-linear scaling allows, for instance, the packing of eight 2K video frames into a single 4K video frame. After decoding, the client system can unpack the relevant viewpoints and then also performs an inverse scaling to reconstruct the target viewpoint. This last step typically happens on a graphics processing unit (GPU) after decoding.

As previously mentioned, the depth components may be generated by the capture system. In this scenario, the capture system stores source view images at a given frequency, estimates the depth components from the source view images and sends depth components (with corresponding meta data e.g. associated video frame) to a server or directly to the client system. The client system receives the metadata and retrieves both the packed original video and the depth components. The client system decodes the source view videos and extracts the video frames for which depth components were received. When switching to the interpolated mode, the stored video frames and depth components are used for new view synthesis of the interpolated image.

Alternatively, the depth components may be generated by a server, wherein the capture system sends the source view images to the server and the server sends the source view images and the depth components to the client system.

The depth components could also be generated by the client system. While the client system renders the selected source video to a display, the client system could simultaneously calculate the depth components for selected moments in time. As soon as the client system switches to the interpolated mode, the most recent completed depth components may be used for view synthesis of the interpolated view.

The generation of the depth components could also be distributed between the client system, the capture system and/or a server. For example, in case where the client system comprises a high-end device with relatively high processing resources, additional depth components could be generated at the client system to add more temporal moments to the ones that are available from the capture system and/or the server.

In another scenario, the server may generate low resolution, partial depth components at many temporal intervals and the client system may then use the partial depth maps as starting points and apply a (limited) number of iterations to generate the final depth components.

Some capture systems (or servers) perform camera rig extrinsic parameter calibration and scene fitting (e.g. fitting a ground surface and a background). The fitted scene data (e.g. plane equations) may then be then passed to the client system such that the client system can calculate the depth components (e.g. using a depth rendering shader).

In summary, the burden of real-time depth estimation for multi-view video is lifted by computing depth at a much lower temporal frequency (i.e. frame rate) than the source view video has. It is proposed to transmit the source videos at the original frame rate at which they were obtained. The client system could then select one of two modes: a source view playback mode for viewing a source video and interactive switching between these source videos and an interpolated playback mode between source views but for a pre-determined (fixed) moment in time.

Figure 2:
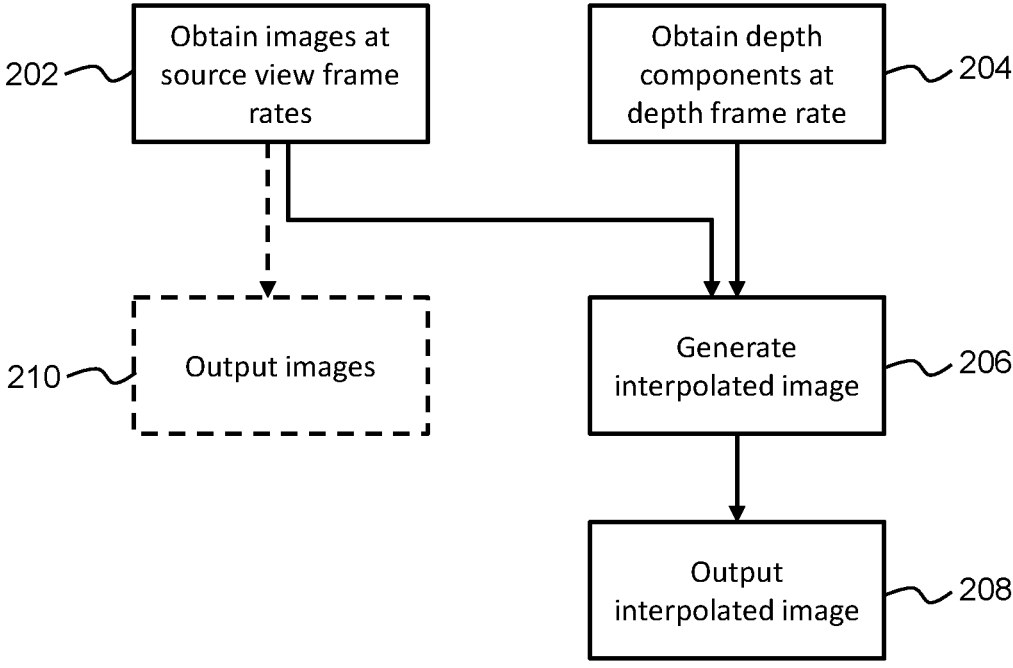
FIG. 2 shows a method for viewing multi-view video data.

FIG. 2 shows a method for viewing multi-view video data. Source view images are obtained at a source view frame rate (i.e. source frame rate) in step 202. Source view depth components (i.e. depth components) are obtained at a source view depth frame rate (i.e. depth frame rate) in step 204. The images output to a display may then depend on which playback mode is selected.

If the interpolated playback mode (i.e. interpolated mode) is selected, an interpolated image is generated (at a target viewpoint), in step 206, and output to a display in step 208.

If the source view playback mode (i.e. source view mode) is selected, the method follows the dashed lines and a sequence of source view images are displayed (i.e. the source video is displayed) in step 210.

The skilled person would be readily capable of developing a processing system for carrying out any herein described method. Thus, each step of a flow chart may represent a different action performed by a processing system, and may be performed by a respective module of the processing system.

A user may be able to navigate through a virtual 3D scene (in interpolated mode) and the generated interpolated images are synthesized based on a target viewpoint defined by the pose of the user in the virtual 3D scene. The movement through the 3D scene may be limited (e.g. movement constrained to a particular volume of the virtual 3D scene).

For example, the user may navigate through the virtual 3D scene by using an application on a smartphone. Touch controls may allow the user to move through the virtual 3D scene (i.e. translate and/or rotate the virtual camera in the 3D scene). The application may allow the user to select a discrete pose (from a list of pre-selected poses) or it may allow the user to change the pose (of the virtual camera) using controls (e.g. touch controls).

A left-right swipe may rotate the virtual camera horizontally around the virtual 3D scene while a prolonged touch may translate the virtual camera forward along the optical axis (i.e. the depth direction).

If, in source view mode, a source view is enlarged/scaled (zoomed in), this is in essence, equivalent to creating a virtual camera with a longer focal length than that of the original camera (which obtained the output sequence). Of course, a zoomed in source view image will have a reduced resolution when compared to the original source view image.

When changing to interpolated mode from a zoomed in sequence, a "zoomed in" interpolated image could be generated (e.g. by selecting a virtual camera with similar pose to the camera which obtained the source view images and a longer focal length). This in essence, is equivalent to changing the lens of the virtual camera in the interpolated mode.

However, in interpolated mode it may seem more natural to a user to translate forward (in the depth direction) instead of scaling the images. This is similar to how translation occurs in video games. Translation forward into the scene then has a similar function as zooming in (i.e. enlarging objects).

When switching to interpolated view, the pose of the virtual camera may need to be determined. A starting pose for the virtual camera may be based on the pose of the camera for which the latest source view images were output. The orientation of the starting pose may be the orientation of the source view camera. Selecting the initial translation (i.e. the 3D coordinate in the virtual 3D scene) of the starting pose may be based on the depth of foreground objects in the scene.

Selecting the virtual camera translation based on size similarity of a distant background may not be an appropriate solution. The virtual camera would appear to fly past all relevant foreground objects until the background had a similar apparent size as the apparent size in the zoomed in source view images.

A solution may be to select one or more foreground objects (e.g. close to the center of the source view images) and use the depth of one or more selected foreground objects to translate the virtual camera forward until the selected foreground objects have a similar size/proportions and preferably the same size/proportions, compared with their appearance in the "zoomed-in" source view image.

The translation of the virtual camera and the zooming in of the interpolated image may be used to generate the sensation of moving forward in the scene and/or zooming into the scene. A combination of both may also be used.

The focal length of the virtual camera in the interpolated mode may be kept constant (e.g. at the average focal length of the cameras for which sequences of source view images have been obtained). Selecting a larger focal length may reduce the pixel resolution of the interpolated image.

As discussed above, the system makes use of processing system to perform the data processing. The processing system can be implemented in numerous ways, with software and/or hardware, to perform the various functions required. The processing system typically employs one or more microprocessors that may be programmed using software (e.g., microcode) to perform the required functions. The processing system may be implemented as a combination of dedicated hardware to perform some functions and one or more programmed microprocessors and associated circuitry to perform other functions.

Examples of circuitry that may be employed in various embodiments of the present disclosure include, but are not limited to conventional microprocessors, application specific integrated circuits (ASICs), and field-programmable gate arrays (FPGAs).

In various implementations, the processing system may be associated with one or more storage media such as volatile and non-volatile computer memory such as RAM, PROM, EPROM, and EEPROM. The storage media may be encoded with one or more programs that when executed on one or more processors and/or controllers, perform the required functions. Various storage media may be fixed within a processor or controller or may be transportable, such that the one or more programs stored thereon can be loaded into a processing system.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A method comprising:
obtaining at least one sequence of source view images of a scene at a source view frame rate;
obtaining at least one sequence of source view depth components of the scene at a source view depth frame rate, wherein the source view depth frame rate is lower than the source view frame rate;
obtaining a selection between a source view playback mode and an interpolated playback mode,
generating an interpolated image of the scene based on the least one source view images from the at least one of the sequence of source view images and on at least one corresponding source view depth components from the at least one sequence of source view depth components if the interpolated playback mode is selected;
caching at least a portion of the at least one sequence of source view images,
outputting the interpolated image to a display if the interpolated playback mode is selected;
outputting a sequence of source view images to the display if the source view playback mode is selected; and
outputting a cached image sequence for a time period that is based on a difference in time between a latest available source view image and a corresponding latest available source depth components, if the selection changes from the interpolated playback mode to the source view playback mode.

2. The method of claim 1, further comprising:

wherein the time period is at least the difference in time between the latest available source view image and the corresponding source view depth components;

selecting at least one closest view image sequence from the at least one sequence of source view images based on a target viewpoint of the interpolated image and source viewpoints of each one of the at least one sequence of source view images if the selection changes from the interpolated playback mode to the source view playback mode;

outputting a cached image sequence corresponding to the at least one closest view image sequence if the selection changes from the interpolated playback mode to the source view playback mode; and after outputting the cached image sequence, outputting the at least one closest view image sequence if the selection changes from the interpolated playback mode to the source view playback mode.

3. The method of claim 1, further comprising:

obtaining an indication of an event, wherein the event occurs in the scene at an event time; and outputting one of the sequence of source view images starting from a source view image taken before the event time based on the selection changing from the interpolated playback mode to the source view playback mode.

4. The method of claim 1, wherein the source view frame rate is at least 20 frames per second and wherein the source view depth frame rate is at most 10 frames per second.

5. The method of claim 1, further comprising:

receiving a target viewpoint for the interpolated image;

identifying at least one closest sequence of source view images of the at least one sequence of source view images based on the target viewpoint; and identifying the latest available source view depth components corresponding to the at least one closest sequence of source view images, wherein generating the interpolated image of the scene is based on the at least one closest sequence of source view images and the identified source view depth components.

6. The method of claim 1, wherein obtaining the sequence of source view images comprises:

receiving an encoded atlas, wherein the atlas comprises at least one scaled sequence of source view images, wherein the at least one scaled sequence of source view images have a lower pixel resolution than the at least one sequence of source view images;

decoding the encoded atlas; and performing an inverse scaling on the at least one scaled sequence of source view images to obtain the at least one sequence of source view images.

7. The method of claim 6, wherein the at least one scaled sequence of source view images comprise at least one non-uniformly scaled source images, and wherein the at least one non-uniformly scaled source images comprise at least one regions of the at least one non-uniformly scaled source images, wherein the at least one non-uniformly scales source images are scaled differently from the rest of the at least one non-uniformly scaled source images.

8. The method of claim 1, wherein obtaining the at least one sequence of source view depth components comprises one of:

receiving the at least one sequence of source view depth components from a server, encoder and/or capture system; and performing depth estimation on at least two of the source view images of the at least one sequence of source view images.

9. The method of claim 1, wherein obtaining the at least one sequence of source view depth components comprises:

receiving at least one sequence of partial source view depth components from a server, encoder and/or capture system;

generating the at least one sequence of source view depth components based on the at least one sequence of partial source view depth components; and performing depth estimation on at least two of the source view images of the at least one sequence of source view images.

10. The method of claim 1, wherein the method further comprises:

selecting at least one closest view image sequence from the at least one sequence of source view images based on a target viewpoint of the interpolated image and source viewpoints of each one of the at least one sequence of source view images if the selection changes from the interpolated playback mode to the source view playback mode;

scaling the source view images of the at least one closest view image sequence so as to make the proportions of the scene in the source view images approximately the same as the proportions of the scene in the interpolated image if the selection changes from the interpolated playback mode to the source view playback mode; and outputting the at least one scaled source view images of the at least one closest view image sequence if the selection changes from the interpolated playback mode to the source view playback mode.

11. The method of claim 1, wherein, generating the interpolated image comprises:

identifying a level of scaling for the output of the at least one sequence of source view images in the source view playback mode if the selection changes from the source view playback mode to the interpolated playback mode; and generating the interpolated image at a target viewpoint if the selection changes from the source view playback mode to the interpolated playback mode, wherein the target viewpoint is based on a source view viewpoint of the output sequence of the at least one sequence of source view images and the level of scaling.

12. A computer program stored on a non-transitory medium, wherein the computer program when executed on a processor performs the method as claimed in claim 1.

13. A decoder comprising:

a processor circuit and a memory circuit, wherein the memory is arranged to store instructions for the processor circuit, wherein the processor circuit is arranged to obtain at least one sequence of source view images of a scene at a source view frame rate, wherein the processor circuit is arranged to cache at least a portion of the at least one sequence of source view images, wherein the processor circuit is arranged to obtain at least one sequence of source view depth components of the scene at a source view depth frame rate, wherein the source view depth frame rate is lower than the source view frame rate, wherein the processor circuit is arranged to obtain a selection between a source view playback mode and an interpolated playback mode, wherein the processor circuit is arranged to generate an interpolated image of the scene based on at least one source view images from at least one of the sequence of source view images and on at least one corresponding source view depth components from the at least one sequence of source view depth components if the interpolated playback mode is selected, wherein the processor circuit is arranged to output the interpolated image to a display if the interpolated playback mode is selected, wherein the processor circuit is arranged to output a sequence of source view images to the display if the source view playback mode is selected; and outputting a cached image sequence for a time period that is based on a difference in time between a latest available source view image and a corresponding latest available source depth components, if the selection changes from the interpolated playback mode to the source view playback mode.

14. The decoder of claim 13, wherein the processor circuit is arranged to cache the portion of the at least one of the sequence of source view images, wherein the time period is at least the difference in time between the latest available source view image and the at least one corresponding source view depth components; and wherein the processor circuit is arranged to select at least one closest view image sequence from the at least one sequence of source view images based on a target viewpoint of the interpolated image and source viewpoints of each one of the sequence of source view images if the selection changes from the interpolated playback mode to the source view playback mode;

wherein the processor circuit is arranged to output a cached image sequence corresponding to the at least one closest view image sequence if the selection changes from the interpolated playback mode to the source view playback mode; and wherein, after outputting the cached image sequence, the processor circuit is arranged to output the at least one closest view image sequence if the selection changes from the interpolated playback mode to the source view playback mode.

15. The decoder of claim 13, wherein the processor circuit is arranged to obtain an indication of an event, wherein the event occurs in the scene at an event time; and wherein the processor circuit is arranged to output one of the sequence of source view images starting from a source view image taken before the event time based on the selection changing from the interpolated playback mode to the source view playback mode.

16. The decoder of claim 13, wherein the processor circuit is arranged to receive a target viewpoint for the interpolated image;

wherein the processor circuit is arranged to identify at least one closest sequence of source view images of the at least one sequence of source view images based on the target viewpoint; and wherein the processor circuit is arranged to identify the latest available source view depth components corresponding to the at least one closest sequence of source view images, wherein generating the interpolated image of the scene is based on the at least one closest sequence of source view images and the identified source view depth components.

17. The decoder of claim 13, wherein obtaining the sequence of source view images comprises:

receiving an encoded atlas, wherein the atlas comprises at least one scaled sequence of source view images, wherein the at least one scaled sequence of source view images have a lower pixel resolution than the at least one sequence of source view images;

decoding the encoded atlas; and performing an inverse scaling on the at least one scaled sequence of source view images to obtain the at least one sequence of source view images.

18. The decoder of claim 17, wherein the at least one scaled sequence of source view images comprise at least one non-uniformly scaled source images, and wherein the at least one non-uniformly scaled source images comprise at least one regions of the at least one non-uniformly scaled source images, wherein the at least one non-uniformly scales source images are scaled differently from the rest of the at least one non-uniformly scaled source images.

19. The decoder of claim 13, wherein obtaining the at least one sequence of source view depth components comprises one of:

receiving the at least one sequence of source view depth components from a server, encoder and/or capture system; and performing depth estimation on at least two of the source view images of the at least one sequence of source view images.

20. The decoder of claim 13, wherein obtaining the at least one sequence of source view depth components comprises:

receiving at least one sequence of partial source view depth components from a server, encoder and/or capture system;

at least one sequence of partial source view depth components; and performing depth estimation on at least two of the source view images of the at least one sequence of source view images.

21. The decoder of claim 13, wherein the processor circuit is arranged to select at least one closest view image sequence from the at least one sequence of source view images based on a target viewpoint of the interpolated image and source viewpoints of each one of the at least one sequence of source view images if the selection changes from the interpolated playback mode to the source view playback mode;

wherein the processor circuit is arranged to scale the source view images of the at least one closest view image sequence so as to make the proportions of the scene in the source view images approximately the same as the proportions of the scene in the interpolated image if the selection changes from the interpolated playback mode to the source view playback mode; and wherein the processor circuit is arranged to output the at least one scaled source view images of the at least one closest view image sequence if the selection changes from the interpolated playback mode to the source view playback mode.

22. The decoder of claim 13, wherein, generating the interpolated image comprises:

identifying a level of scaling for the output of the at least one sequence of source view images in the source view playback mode if the selection changes from the source view playback mode to the interpolated playback mode; and generating the interpolated image at a target viewpoint if the selection changes from the source view playback mode to the interpolated playback mode, wherein the target viewpoint is based on a source view viewpoint of the output sequence of the at least one sequence of source view images and the level of scaling.

* * * * *